US011132353B2

(12) United States Patent
Guim Bernat et al.

(10) Patent No.: US 11,132,353 B2
(45) Date of Patent: Sep. 28, 2021

(54) NETWORK COMPONENT, NETWORK SWITCH, CENTRAL OFFICE, BASE STATION, DATA STORAGE, METHOD AND APPARATUS FOR MANAGING DATA, COMPUTER PROGRAM, MACHINE READABLE STORAGE, AND MACHINE READABLE MEDIUM

(71) Applicant: Intel Corporation, Santa Clara, CA (US)

(72) Inventors: Francesc Guim Bernat, Barcelona (ES); Karthik Kumar, Chandler, AZ (US); Mark Schmisseur, Phoenix, AZ (US); Timothy Verrall, Pleasant Hill, CA (US); Thomas Willhalm, Sandhausen (DE)

(73) Assignee: Intel Corporation, Santa Clara, CA (US)

( * ) Notice: Subject to any disclaimer, the term of this patent is extended or adjusted under 35 U.S.C. 154(b) by 623 days.

(21) Appl. No.: 15/949,097

(22) Filed: Apr. 10, 2018

(65) Prior Publication Data

US 2019/0042617 A1    Feb. 7, 2019

(51) Int. Cl.
*G06F 16/00* (2019.01)
*G06F 16/23* (2019.01)
(Continued)

(52) U.S. Cl.
CPC .......... *G06F 16/2365* (2019.01); *G06F 16/27* (2019.01); *H04L 67/1095* (2013.01);
(Continued)

(58) Field of Classification Search
CPC . G06F 16/2365; G06F 16/27; H04L 67/1095; H04L 67/1097; H04W 4/70
(Continued)

(56) References Cited

U.S. PATENT DOCUMENTS

| 2010/0149993 | A1* | 6/2010 | Kakadia | H04L 69/40 370/242 |
| 2010/0161759 | A1* | 6/2010 | Brand | H04L 67/1097 709/218 |

(Continued)

*Primary Examiner* — Thanh-Ha Dang
(74) *Attorney, Agent, or Firm* — 2SPL Patent Attorneys PartG mbB; Charles Blackledge

(57) ABSTRACT

Examples provide a network component, a network switch, a central office, a base station, a data storage element, a method, an apparatus, a computer program, a machine readable storage, and a machine readable medium. A network component (10) is configured to manage data consistency among two or more data storage elements (20, 30) in a network (40). The network component (10) comprises one or more interfaces (12) configured to register information on the two or more data storage elements (20, 30) comprising the data, information on a temporal range for the data consistency, and information on one or more address spaces at the two or more data storage elements (20, 30) to address the data. The network component (10) further comprises a logical component (14) configured to effect data updating at the two or more data storage elements (20, 30) based on the information on one or more address spaces at the two or more data storage elements (20, 30) and based on the information on the temporal range for the data consistency.

18 Claims, 8 Drawing Sheets

(51) Int. Cl.
  *H04L 29/08* (2006.01)
  *G06F 16/27* (2019.01)
  *H04W 4/00* (2018.01)
  *H04W 4/70* (2018.01)
  *H04W 4/90* (2018.01)
  *H04W 4/10* (2009.01)

(52) U.S. Cl.
  CPC ........... *H04L 67/1097* (2013.01); *H04W 4/00* (2013.01); *H04W 4/10* (2013.01); *H04W 4/70* (2018.02); *H04W 4/90* (2018.02)

(58) Field of Classification Search
  USPC ......................................................... 707/634
  See application file for complete search history.

(56) References Cited

U.S. PATENT DOCUMENTS

| | | | | |
|---|---|---|---|---|
| 2012/0042146 | A1* | 2/2012 | Gandhi | G06F 3/0611 |
| | | | | 711/165 |
| 2013/0151563 | A1* | 6/2013 | Addepalli | G06F 16/2477 |
| | | | | 707/792 |
| 2013/0166749 | A1* | 6/2013 | Kruglick | H04L 47/125 |
| | | | | 709/226 |
| 2014/0344379 | A1* | 11/2014 | Chakraborti | H04L 65/403 |
| | | | | 709/206 |
| 2015/0032982 | A1* | 1/2015 | Talagala | G06F 3/0619 |
| | | | | 711/162 |
| 2015/0304220 | A1* | 10/2015 | Miyao | H04L 47/19 |
| | | | | 370/230 |
| 2016/0110434 | A1* | 4/2016 | Kakaraddi | G06F 11/3006 |
| | | | | 707/602 |
| 2016/0342486 | A1* | 11/2016 | Kedem | G06F 11/1471 |
| 2017/0024161 | A1* | 1/2017 | Katiyar | G06F 3/0689 |
| 2017/0177224 | A1* | 6/2017 | Glover | G06F 3/0653 |
| 2017/0199675 | A1* | 7/2017 | Subramanian | G06F 3/0652 |
| 2017/0199678 | A1* | 7/2017 | Subramanian | G06F 3/0611 |
| 2017/0324678 | A1* | 11/2017 | Li | H04L 47/827 |
| 2017/0366472 | A1* | 12/2017 | Byers | G06F 9/50 |
| 2018/0124646 | A1* | 5/2018 | Thubert | H04W 48/18 |
| 2018/0173570 | A1* | 6/2018 | Chintalapally | G06F 9/5044 |
| 2018/0300124 | A1* | 10/2018 | Malladi | H04L 12/2823 |
| 2018/0365281 | A1* | 12/2018 | Patel | G06F 16/148 |
| 2019/0050264 | A1* | 2/2019 | Chintalapally | G06F 9/4881 |
| 2019/0058709 | A1* | 2/2019 | Kempf | H04L 9/3226 |
| 2019/0208007 | A1* | 7/2019 | Khalid | G06F 16/178 |
| 2019/0230385 | A1* | 7/2019 | Beck | H04L 65/80 |
| 2020/0005234 | A1* | 1/2020 | Tomimoto | G06Q 30/02 |
| 2020/0028910 | A1* | 1/2020 | Tomimoto | H04B 7/14 |

* cited by examiner

FIG. 5
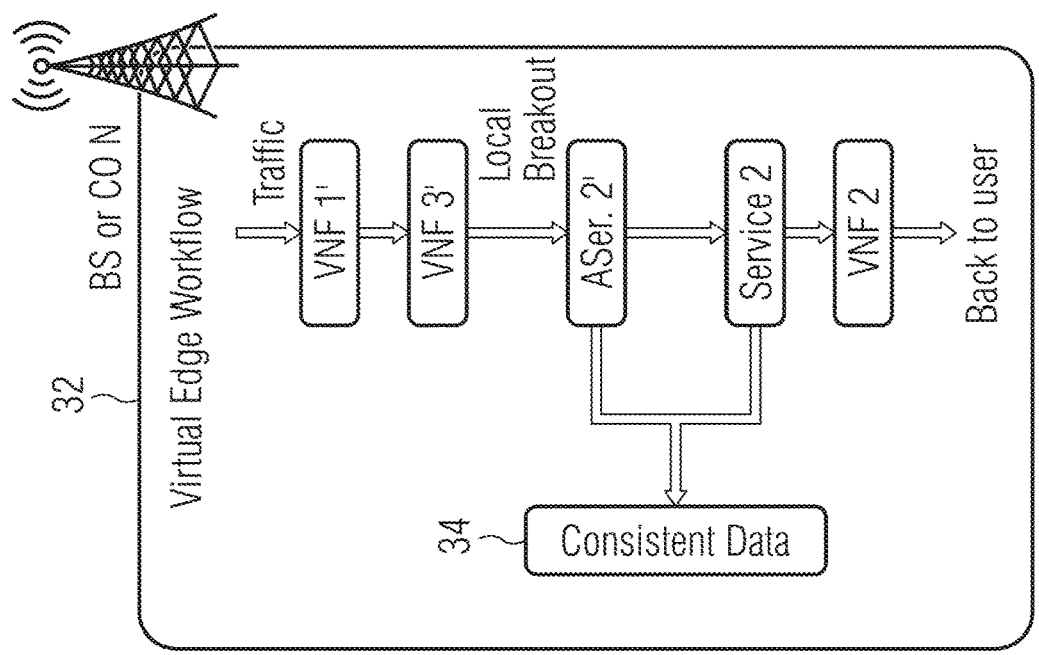
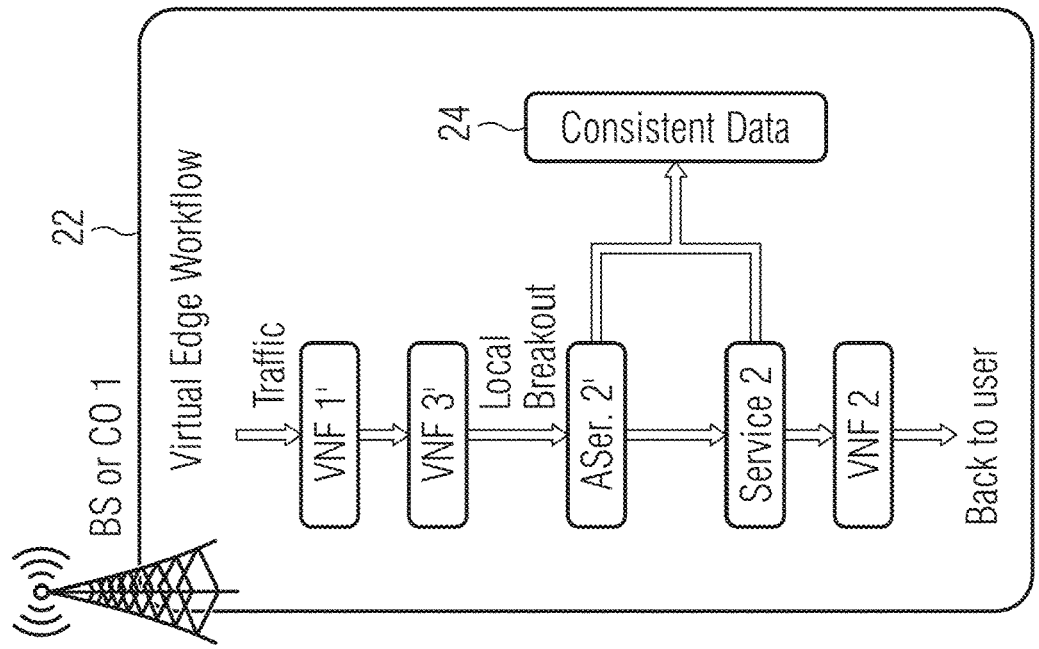

NETWORK COMPONENT, NETWORK SWITCH, CENTRAL OFFICE, BASE STATION, DATA STORAGE, METHOD AND APPARATUS FOR MANAGING DATA, COMPUTER PROGRAM, MACHINE READABLE STORAGE, AND MACHINE READABLE MEDIUM

FIELD

Examples relate to a concept for data replication in a network and in particular to a network component, a network switch, a central office, a base station, a data storage element, a method, an apparatus, a computer program, a machine readable storage, and a machine readable medium.

BACKGROUND

Network architecture has been developing toward cloud based networks. While cloud based network architecture may provide enhanced load distribution and efficiency, it may introduce additional delays. For low delay services so called edge computing mechanisms are considered, which enable service provision or resource assignment at the edge of the network to reduce the delay. Edge computing is an emerging paradigm where computing is performed at the edge of a network instead of at the cloud.

BRIEF DESCRIPTION OF THE FIGURES

Some examples of apparatuses and/or methods will be described in the following by way of example only, and with reference to the accompanying figures, in which FIG. 5 shows examples of network components at base stations or central offices.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B, if not explicitly or implicitly defined otherwise. An alternative wording for the same combinations is "at least one of A and B" or "A and/or B". The same applies, mutatis mutandis, for combinations of more than two elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Figure 1:
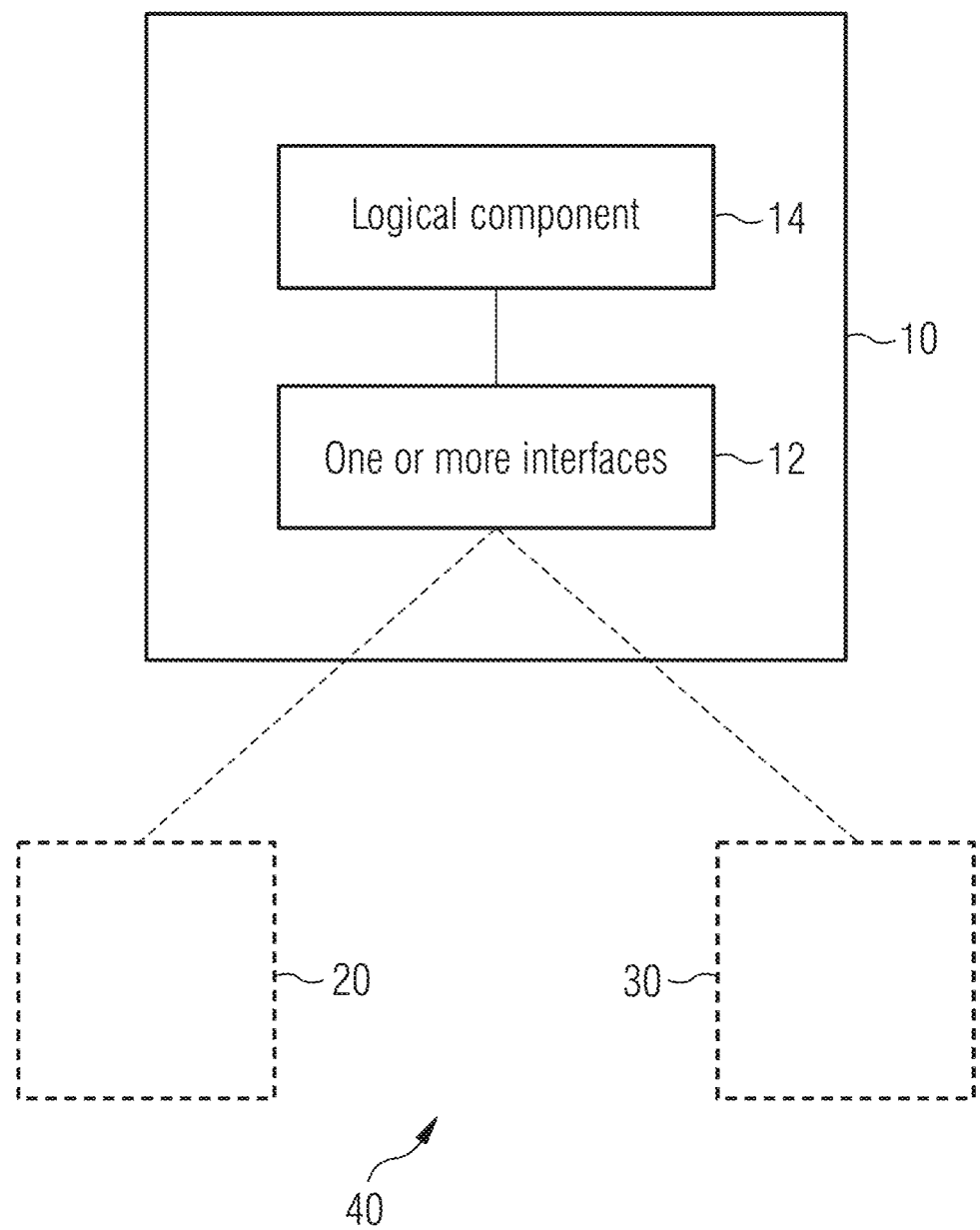
FIG. 1 shows examples of a network component or an apparatus for managing data.

FIG. 1 shows an example of a network component 10. The network component 10 is configured to manage data consistency and/or replication among two or more data storage elements 20, 30 in a network 40. The network component 10 comprises one or more interfaces 12, which are configured to register information on the two or more data storage elements comprising the data, to register information on a temporal range for the data consistency, and to register information on one or more address spaces at the two or more data storage elements to address the data. The network component further comprises a logical component 14, which is coupled to the one or more interfaces 12. The logical component 14 is configured to effect data consistency, alignment and/or updating at the two or more data storage elements based on the information on one or more address spaces at the two or more data storage elements and based on the information on the temporal range for the data consistency.

FIG. 1 also illustrates an example of a network 40 comprising an example of the network component 10 and the two or more data storage elements 20, 30. In examples the network component 10 may correspond to any apparatus 10 for managing data. Multiple further network elements are conceivable in which the network component 10 or apparatus 10 can be comprised in. Some examples are a network switch, a central office, a base station, and a data storage element 20, 30, which may comprise an example of the network component 10 or apparatus 10. In some examples, the two or more data storage elements are comprised in base stations or central offices in a cloud based communication network. The cloud based network can be configured to provide edge computing services at the two or more data storage elements.

In examples the network 40 may comprise a mobile communication system, for example, any Radio Access Technology (RAT). Corresponding transceivers (for example mobile transceivers, user equipment base stations, relay stations) in the network or system may, for example, operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17), 3GPP Rel. 18 (3rd Generation Partnership Project Release 18), 3GPP 5G, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code Division Multiple Access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Public Land Mobile Telephony), MTD (Swedish abbreviation for Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handyphone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay), technologies operating above 300 GHz and THz bands, (3GPP/LTE based or IEEE 802.11p and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as IntelligentTransport-Systems and others.

Examples may also be applied to different Single Carrier or OFDM flavors (CP-OFDM, SC-FDMA, SC-OFDM, filter bank-based multicarrier (FBMC), OFDMA) and in particular 3GPP NR (New Radio) by allocating the OFDM carrier data bit vectors to the corresponding symbol resources.

An access node, base station or base station transceiver can be operable to communicate with one or more active mobile transceivers or terminals and a base station transceiver can be located in or adjacent to a coverage area of another base station transceiver, e.g. a macro cell base station transceiver or small cell base station transceiver. Hence, examples may provide a mobile communication system comprising one or more mobile transceivers and one or more base station transceivers, wherein the base station transceivers may establish macro cells or small cells, as e.g. pico-, metro-, or femto cells. A mobile transceiver may correspond to a smartphone, a cell phone, user equipment, a laptop, a notebook, a personal computer, a Personal Digital Assistant (PDA), a Universal Serial Bus (USB)-stick, a car. A mobile transceiver may also be referred to as UE or mobile in line with the 3GPP terminology.

A base station transceiver can be located in the fixed or stationary part of the network or system. A base station transceiver may correspond to a remote radio head, a transmission point, an access point or access node, a macro cell, a small cell, a micro cell, a femto cell, a metro cell. A base station transceiver can be a wireless interface of a wired network, which enables transmission of radio signals to a UE or mobile transceiver. Such a radio signal may comply with radio signals as, for example, standardized by 3GPP or, generally, in line with one or more of the above listed systems. Thus, a base station transceiver may correspond to a NodeB, an eNodeB, a Base Transceiver Station (BTS), an access point, a remote radio head, a transmission point, which may be further divided into a remote unit and a central unit.

In examples the one or more interfaces 12 as indicated in FIG. 1 may correspond to any means for registering, obtaining, receiving, transmitting or providing analog or digital signals or information, e.g. any connector, contact, pin, register, input port, output port, conductor, lane, which allows providing a signal or information. An interface 12 may be wireless or wireline and it may be configured to communicate, i.e. transmit or receive signals or information with further internal or external components.

In examples the logical component 14 may correspond to any means for effecting data replication at the two or more data storage elements 20, 30 based on the information on one or more address spaces at the two or more data storage elements 20, 30. The logical component 14 or means for effecting may be implemented using one or more processing units, one or more processing or controlling devices, any means for processing/controlling, any means for determining, any means for calculating, such as a processor, a computer, a controller or a programmable hardware component being operable with accordingly adapted software. In other words, the described function of the means 14 or the logical component 14 may as well be implemented in software, which is then executed on one or more programmable hardware components. Such hardware components may comprise a general purpose processor, a controller, a Digital Signal Processor (DSP), a micro-controller, any hardware capable of executing software instructions. In examples accelerated hardware, e.g. an FPGA (Field Programmable Gate Array), may be used to implement the means 14 or the logical component 14.

Figure 2:
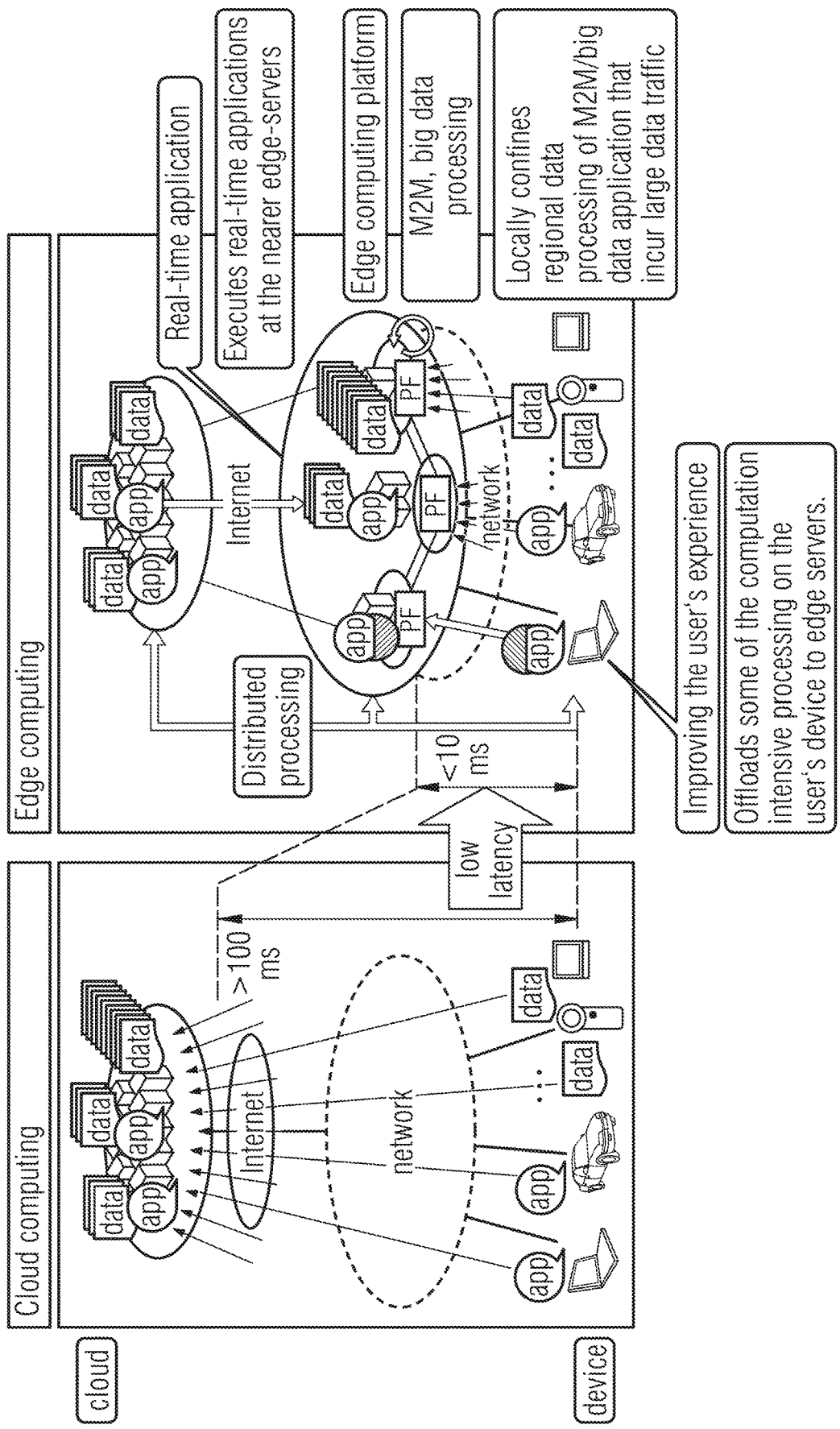
FIG. 2 shows an example network architecture with edge computing.

Examples may enable a hierarchical high-speed consistency data model for edge computing networks. FIG. 2 illustrates pictorially how edge computing is different from cloud computing. FIG. 2 shows an example network architecture with edge computing on the right hand side and a regular cloud computing network on the left hand side. The network cloud is depicted at the top and devices using network services at the bottom. As indicated in FIG. 2 at bottom the devices may comprise portable computers, vehicles, smartphones, which use an access network to access the internet, which also connects to cloud services provided by certain applications and data. The regular cloud scenario is shown on the left hand side and it can be assumed that cloud based services, i.e. services being provided by network components in the cloud, may realize latency times of about 100 ms. Low latency services may, however, require latency times as short as 10 ms or even shorter. This may lead to a distributed processing architecture as shown on the right hand side of FIG. 2.

In the architecture shown on the right of FIG. 2 there is a processing capability just in the access network's proximity. Nodes of the access network, e.g. base stations, may provide services or proximity functions with low latency times. Such edge or proximity computing may improve the user's experience. The user's device may offload some of the computation intensive processing from the user's device to the edges servers. The edge servers may support real-time applications. In some examples even nearer edge servers may be selected to execute real-time applications.

The edge servers or the processing capacities may establish an edge computing platform, e.g. for machine-to-machine (M2M), big data processing or locally confined regional data processing of M2M/big data applications that may incur large data traffic. Edge clouding or edge computing may hence enable ultra-low latency response times, when compared to the cloud—and this latency may be a key to enable a whole new class of applications, including surveillance, autonomous driving. One challenge with edge computing may be that it is resource constrained: while it is not uncommon to see databases with TBs of data in the cloud, limited resources at the edge may be challenging.

Figure 3:
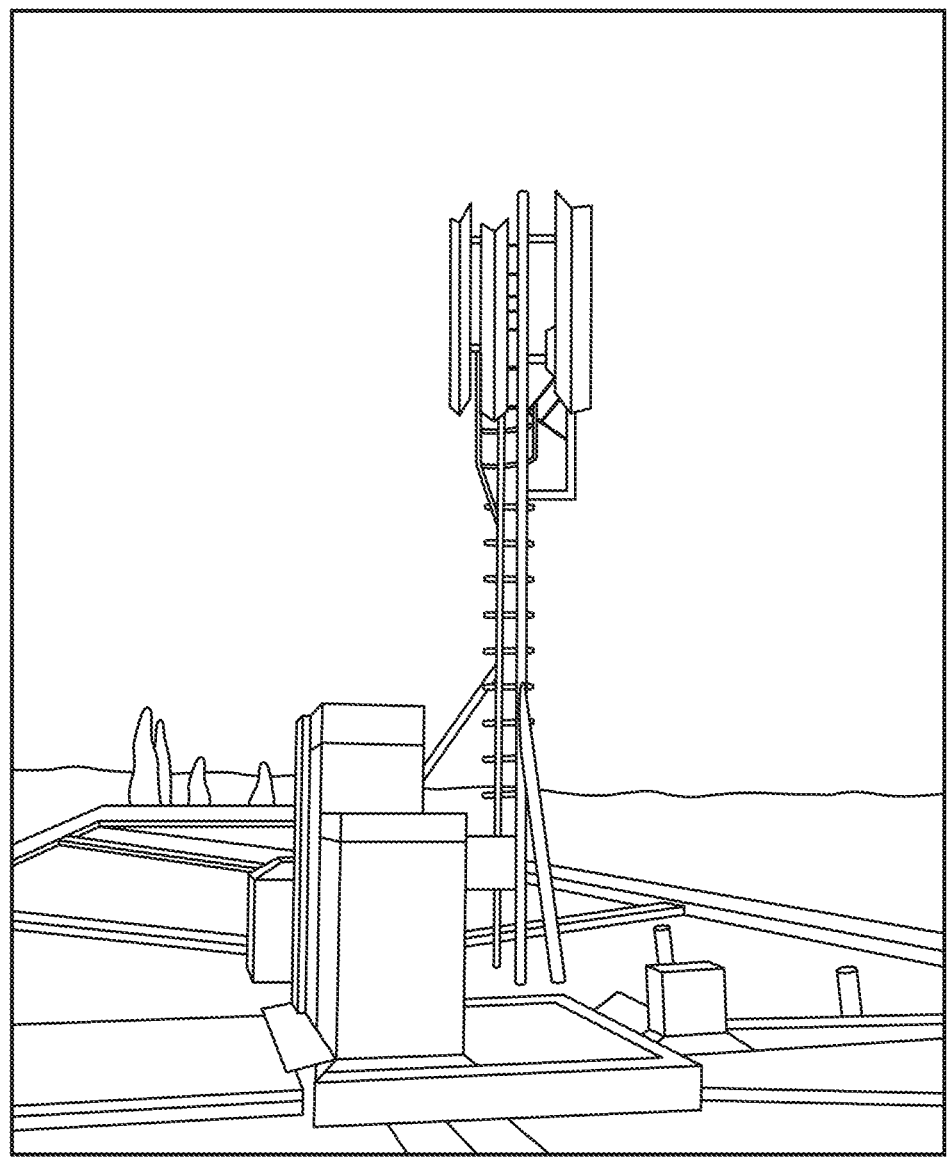
FIG. 3 shows an example of a base station.
Figure 4:
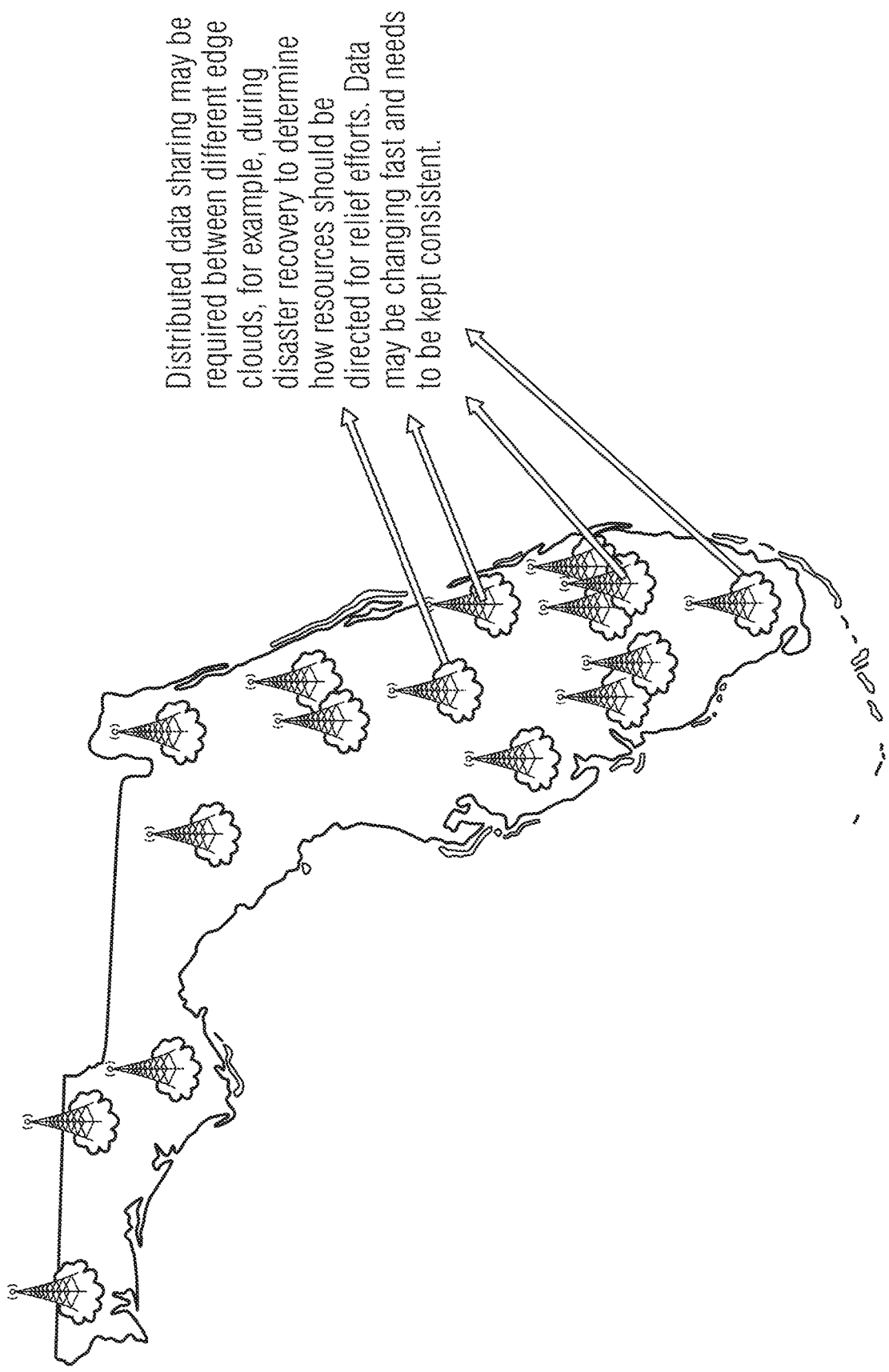
FIG. 4 shows an example network comprising multiple base stations.

However, for some applications data needs to be situated at the edge in order to be able to access the data with the low latency requirements that are necessitated by the emerging class of applications. For this, one can leverage the classic CDN (content delivery network) mechanisms to cache a subset of a database at the edge nodes. For example, FIGS. 3 and 4 illustrate an example for disaster recovery. Disaster recovery refers to the process after a disaster has happened, e.g. a hurricane, a tornado, any natural catastrophe. After such a disaster data may be collected from mobile devices in a mobile communication system, such data may comprise temperature data, traffic data, data on damages, visual data. Furthermore, such data should be made available with low delay by multiple edge nodes, e.g. base station, and hence such data should be kept consistent.

FIG. 3 shows an example of a base station and FIG. 4 shows an example network comprising multiple base stations. FIG. 3 depicts a baseband unit or base station aggregation point, which may constitute a first level of a storage gateway for an edge cloud—several of which are shown in the map in FIG. 4. FIG. 4 illustrates a network scenario in which multiple IoT (internet of things) devices are used to update in pseudo real time data that needs to be consistent across multiple central offices (CO), which are not shown in FIG. 4. Distributed data sharing may be required between different edge clouds, for example, during disaster recovery to determine how resources should be directed for relief efforts. Data may be changing fast and may need to be kept consistent.

Data may change fast in times of a disaster and decisions made (for example, how to focus relief and rescue efforts) require a global view of the data. Examples, may enable to replicate or even keep a consistent view of memory and storage for selected data items across edge clouds in edge cloud architectures, for example, as the ones introduced above. In another example multiple thousands of IoT devices update data models across multiple central offices that need to be consistently viewed in order to take a pseudo real time decision. In such a network base stations as shown in FIG. 4 may be located at the edge of the network (tier one) and each base station may be coupled to one or more central offices (tier two).

Examples can be designed to address data caching and storage in traditional data center architectures. Several ways of realizing this are conceivable, e.g. via software architectures that may use a communication service provider's network or data center. For example, a network server may cache popular content in an area. This may reduce operational costs and network traffic. Large contents for specific users may be cached at request or automatically by deploying a server that collects data and usage patterns. Based on this information, the server may decide on the contents to be cached. Some examples may temporarily store content and share it across users without using the internet. However, some of these mechanisms may defeat the latency needs of edge cloud architectures.

Some edge cloud computing architectures may have different requirements and usages. Some examples may consider that tenants and type of contents might not be known a priori and the effect of sharing storage potentially with different telecommunication service providers (TSP), content service providers (CSP) or tenants may be considered. Examples may consider hierarchal architectures with the particularities of the edge cloud computing architectures. Some examples may keep data consistency across multiple data base stations or central offices. Such consistency may be achieved with software or at least partly with software. Examples may reduce the total cost of ownership (TCO) and may enable real time services in the network. Examples may be based on the finding that restrictions on the platforms and hierarchal architectures can be considered, and in the context of an edge cloud architecture the more you move to the customer or device physical the more space, resource and power constraints you have. Examples may assume end to end physical security requirements. In the case of edge cloud, base stations may be deployed in places where physical surveillance may not be guaranteed.

Examples may use end to end hardware acceleration for storage management in a multitier architecture. Examples may reduce TCO and may devote resources for effective computing. For example, in a base station computing resources may be used for communication services and CSP workloads.

In some examples, a platform hosting data (in platform memory/storage for compute sleds or in pooled memory/storage for disaggregated resources) may include logic, e.g. the logical component 14, that allows each tenant running or managing content (either storage or memory) in a platform or in a pooled resource to specify:

Specific data ranges that should be consistent across multiple peers at the same level (i.e. central offices or base stations); and what is the level of consistency expected (i.e. needs to be consistent within a temporal range of few milliseconds).

For example, event based data replication may be used in some examples. The one or more interfaces 12 may then be further configured to receive information on a data change of the data in the one or more address spaces, and the logical component 14 is configured to effect data alignment, consistency, and/or replication at the two or more data storage elements 20, 30 based on the information on the data change. In further examples temporal alignment of the data at the two or more data storage elements 20, 30 may be carried out. The one or more interfaces 12 may then be further configured to receive information on a time interval for data alignment, consistency, or updating at the two or more data storage elements 20, 30. The logical component 14 may then be configured to effect data alignment at the two or more data storage elements 20, 30 based on the information on the time interval. Data replication or consistency maintenance may, for example, be carried out by means of determining and comparing checksums of data sets at different data storage elements 20, 30. Identical checksums may indicate identical data sets, differing checksums may trigger data updates.

In an example the network component 10 is configured to manage data consistency among the two or more data storage elements. The one or more interfaces 12 are configured to register information on a temporal range for the data consistency. The logical component 14 is configured to effect data replication or data updating at the two or more data storage elements 20, 30 based on the information on the temporal range for the data consistency. The information on the one or more address spaces at the two or more data storage elements 20, 30 may comprise information on specific data ranges that are to be replicated and/or to be kept consistent. The information on the temporal range may specify a period of time and the logical component 14 may be configured to effect data consistency/alignment at the two or more data storage elements within the period of time. In some examples, the logical component 14 or the means for effecting data consistency may be configured to effect data updating at the two or more data storage elements using data invalidation. For example, data invalidation may be a means of enforcing consistency. Instead of updating all other copies of newly received/modified data, some examples may invalidate them. This may require higher latency when one needs to fetch the latest copy of the data, but may be a simpler scheme to implement.

In further examples a certain quality of service (QoS) or service level agreement (SLA) requirement may be specified in order to guarantee that specific bandwidth is provided to the particular tenant when data needs to be replicated or kept consistent across multiple peers. The one or more interfaces 12 may then be further configured to receive information on a quality of service or information on a service level agreement. The logical component 14 may be configured to effect a certain bandwidth availability in the network based on the information on the quality of service or the information on the service level agreement. The logical component 14 may be configured to track data in the address spaces at the two or more data storage elements 20, 30 and to propagate data changes to the data storage elements 20, 30.

The logical component 14 may be configured to register a bit-stream in the network to implement a data replication policy.

In another example, additionally or alternatively, a list of peers that need to be consistent with certain data is specified. This can be implemented in a multicast group identification (ID) concept or via other new type of fabric methods. The information on the two or more data storage elements 20, 30 may then comprise information on a group identification of a group of multiple data storage devices.

The aforementioned logic 14 may be responsible to track the address ranges specified by the tenant and propagate changes to the peers 20, 30 when required (based on the time constraints specified by the tenant). It allows tenants to register their own bit-streams (i.e. for FPGA) that may implement more sophisticated consistency policies. Different implementation options are possible in examples. The protocol may be implemented in a hierarchical way. In this case a current element of a tier is responsible to require the upper level of the hierarchy to propagate the changes (i.e. from base station to central office—or from central office to data center). The network 40 may hence comprise a hierarchical architecture with multiple tiers of network elements in multiple tier levels. The logical component 14 may be configured to communicate a request for data consistency or replication to a component in a tier being at least one tier level above a tier comprising the two or more data storage components 20, 30.

In another implementation the protocol is implemented in a peer to peer way. In this case the current element of the tier is responsible to propagate changes across multiple instances. The network 40 again comprises a hierarchical architecture with multiple tiers of network elements in multiple tier levels. The logical component 14 is configured to communicate a request for data consistency or replication to a component in a tier being on the same tier level as a tier comprising the two or more data storage components 20, 30.

In a further implementation the protocol is implemented in a hybrid mode. It starts in a peer to peer way and it changes to hierarchical when too many conflicts are identified. The network 40 then comprises a hierarchical architecture with multiple tiers of network elements in multiple tier levels. The logical component 14 is configured to communicate a request for data consistency or replication firstly to a component in a tier being on the same tier level as a tier comprising the two or more data storage components, to monitor a number of conflicts arising by the request in the network, and, in case the number of conflicts exceeds a threshold, to communicate the request for data consistency or replication secondly to a component in a tier being at least one level above the tier comprising the two or more data storage components.

In this implementation, the protocol may require that the element 10 initiating the propagation is responsible to identify and address conflicts (e.g. multiple updates for conflicting same address range). A conflict may hence arise by a request in the network corresponding to an address conflict based on multiple updates for the same address range at a data storage element.

The above described first implementation using hierarchical reporting to an upper level tier may have less complexity but it may be less scalable. The latter implementation (hybrid) probably has the best performance but it may incur in more resource requirements.

FIG. 5 shows examples of network components 10 at base stations or central offices 100. FIG. 5 shows a first base station or central office 22 on the left and a second base station or central office 32 on the right, which are referred to as data storage elements 22 and 32 in the following. In both data storage elements 22, 32 the same virtual edge workflow takes place, involving calls to virtual network function (VNF1, VNF2, VNF3) and local breakouts by calling "ASER.2'" and "Service 2" resulting in the two calls for consistent data 24, 34. In line with the above the network components 10 at the respective data storage elements 22, 32 then achieve data consistency or coherency across the multiple base stations or central offices using time aware consistency (data consistency within a temporal range). FIG. 4 illustrates a high level architecture and ingredients.

The architecture used in examples may address one of the key use cases with respect to edge cloud architectures. Communication service providers (CSP) and cloud service providers (CSPs) and customers may ask for the need of scalable, secure, automated and customized solutions.

Examples may provide a higher computing density by the usage of accelerated architecture and using such computing for non accelerable workloads. Examples may provide a transparent scalable and secure architecture per tenant, and customizable data management by usage of acceleration on how data needs to be pre-processed and managed.

Examples may relate to generation of edge cloud computing data centers and platform architectures intercepting first 5G (Fifth Generation mobile communication systems) deployments.

Figure 6:
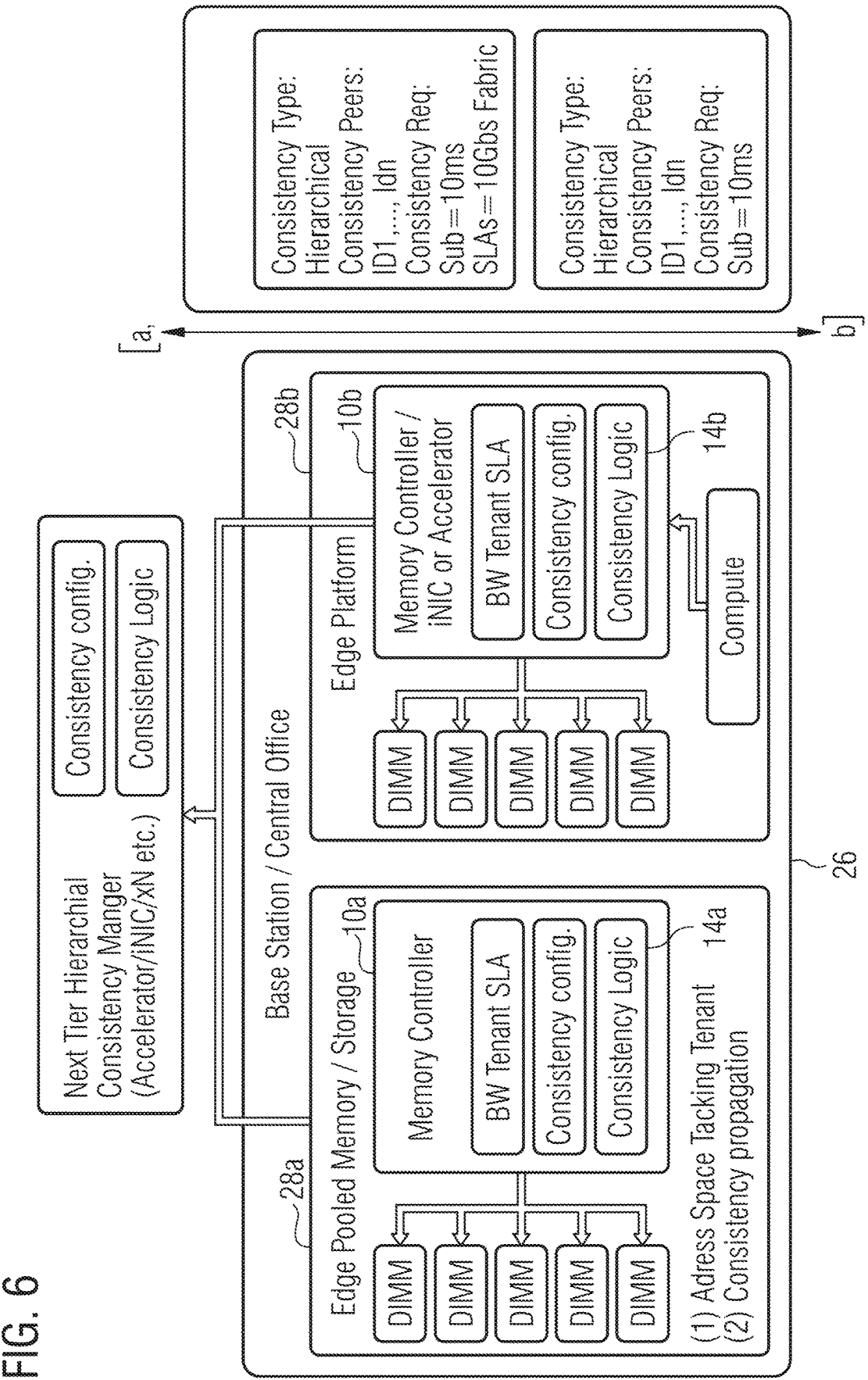
FIG. 6 depicts an example of a base station or central office implementation.

FIG. 6 depicts an example of a base station or central office 26 implementation. As shown in FIG. 6 the example comprises an edge pooled memory/storage 28*a* and an edge platform 28*b*, each of which comprises a memory controller 10*a*, 10*b* being coupled to multiple DIMMs (Dual Inline Memory Modules). The memory controller 10*b* can be on an integrated network interface card or an accelerator. Both memory controllers 10*a*, 10*b* comprise an example of the above described network component 10. At both components 10*a*, 10*b* a tenant may register a certain bandwidth or service level agreement, a data consistency configuration and both components 10*a*, 10*b* comprise consistency logical components 14*a*, 14*b* in line with the above-described logical component 14. In this example the above hierarchical implementation is assumed in which the next tier comprises a hierarchical consistency manager with the consistency configuration and a consistency logic as well. Therewith, a potential user can register a consistency type (e.g. hierarchical), a group of two or more consistency peers or data storage elements, and certain consistency requirements, e.g. a temporal range or SLAs.

As depicted in FIG. 6, some examples may create a holistic storage gateway architecture that may be placed in the different tiers of a communication service provider that manages a set of pooled memory and storage resources. Examples may enable a secure and scalable concept. Examples may allow configuring per tenant how data is replicated across the edges and how it has to be kept consistent. As mentioned before, examples of the network component 10 may be responsible to track the address ranges specified by a tenant and propagate changes to the peers (data storage elements) when required (e.g. based on the time constraints specified by the tenant. Multiple approaches are conceivable. For example, the protocol may be implemented in a hierarchical way. In this case a current element of a tier is responsible to require the upper level of the hierarchy to propagate the changes (i.e. from base station to central office or from central office to data center). Examples using this hierarchical approach may enable better conflict resolution options when many conflicts in the content updates are expected with respect to the replicated data. This may reduce a number of overall conflict resolution messages. Such examples may rely on the next level in the hierarchy to serialize updates on the same data sets and may add a level of extra latency.

Other examples may use a peer to peer concept. In this case a current element of the tier is responsible to propagate changes across multiple instances. Examples of this variant may be particularly beneficial when a lower number of conflicts is expected. Examples using the peer to peer approach may be more scalable and may enable lower latencies as compared to the hierarchical approach, because they do not rely on a single point to propagate changes. Similarly they can be more reliable in the sense that they do not need to coordinate with an element in the higher hierarchy to propagate changes. However, when the number of conflicts is high, the hierarchical approach may provide benefits as the peer to peer approach may produce higher overheads and fabric costs when the conflict ratio is high.

Further examples may use a hybrid solution using both hierarchical and peer to peer approaches. For example, the strategy or approach may be changed based on the conflict ratio. Examples implementing a hybrid approach of the two previous approaches may hence change from one to the other based on the conflict ratio. Such examples may get the best of the two other options but it may require or consume more resources and may pay an extra cost every time that a change is done from one to the other model.

Each of the data tiers (i.e. central office) may include one or multiple pooled storage or memory elements that manage a set of storage gateway tenants at that particular tier that are connected to one or multiple nodes managing the data for that tenant. In examples using the hierarchical implementation may be implemented on different levels of the architecture.

One implementation may be at an upper tier element (i.e. platform or accelerator in the central office comprising an example of the network component 10 managing consistency for a set of base stations). Another implementation may be at an upper fabric element (e.g. a switch connecting multiple base stations comprising an example of the network component 10 managing consistency for a set of base stations.

Pooled storage management in examples may include modifications at different areas. For example, potential changes may be introduced by the network component 10 at a network switch or at an upper tier level. For example, a network switch may be extended with the functionality of an example of the network component 10 that is responsible to automatically manage consistency updates targeting a particular edge cloud storage gateway, a particular tenant and potentially a particular address space at the data storage elements 20, 30 as introduced above. A network switch may be extended with an example of the network component 10 comprising the one or more interfaces 12 to register and deregister replication flows per edge cloud storage gateway target, tenant and potentially address space or list of address ranges. For example, each tenant can be identified by a communication service provider ID, a cloud service provider ID, a tenant ID, and a list of peers (data storage elements) that the data needs to be replicated or to be kept consistent at when the request comes from the lower tier.

In examples, an owner ID can be a combination of any of the former fields. For example, the one responsible to decide how replication is actually performed to achieve certain level of resiliency may be a pod manager, managing a pod of data storage element and being the entity at which an example of the above network component 10 may be implemented. Moreover, the one or more interfaces 12 may allow registering and deregistering QoS, SLA and priorities among traffic targeting the edge cloud storage gateways (data storage elements). A switch may allow the pod manager to specify certain priorities for a list of owner IDs and their corresponding list of address ranges. It may further allow specifying certain guarantees for a list of owners ID and their corresponding list of address ranges. In some examples, the logical component 14 may perform load balancing among read requests targeting replicated resources. Similarly, the one configuring this logic may be the pod manager. In example the logical component 14 may be responsible to implement the aforementioned methods.

Note that despite this logic is described in the context of the switch potentially it can be mapped inside a compute element/network component 10 (compute or acceleration sled) in the upper level of the hierarchy responsible to manage consistency requests across multiple elements on the lower level (e.g. an accelerator sled in the data center managing consistency across N different central offices, N being a positive integer number).

Figure 7:
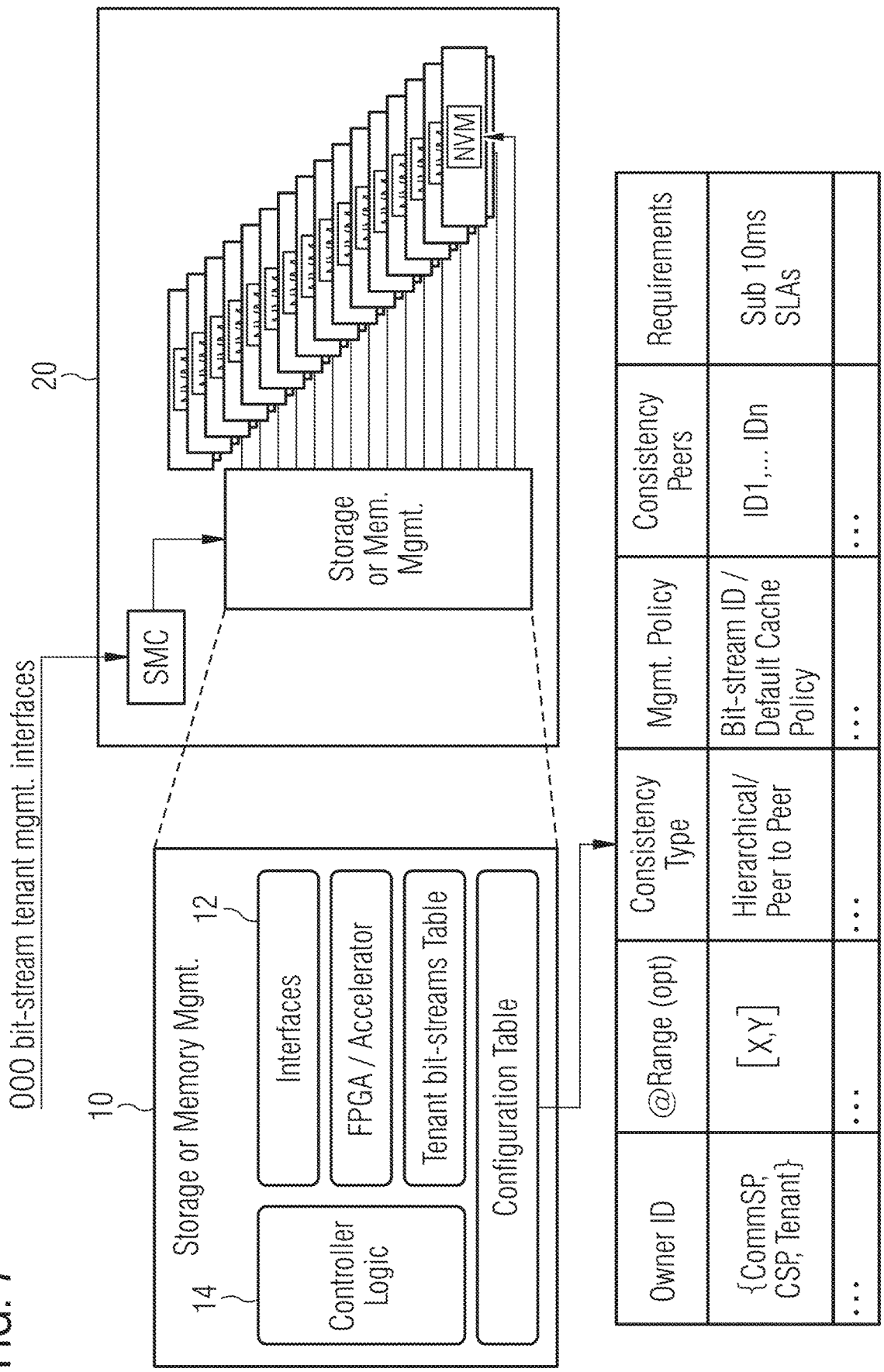
FIG. 7 illustrates an architecture in an example.

FIG. 7 illustrates another architecture in an example. FIG. 7 shows on the left hand side an example of the network component 10 with the one or more interfaces 12 and the logical component 14 implemented as controller logic. As shown in FIG. 7 the network component 10 may be implemented as storage of memory management entity and it may comprise further components, e.g. a FPGA/accelerator unit, a tenant bit-stream table, and a configuration table. As further shown in FIG. 7 the configuration table may comprise entries for an owner ID, a memory range, a consistency type, a management policy, the consistency peers or data storage elements, requirements. The storage or memory management unit may be coupled to memory modules, for example, a number of non-volatile memory modules as indicated in FIG. 7. Hence FIG. 7 shows an example of a data storage element 20 comprising the network component 10. As further shown in FIG. 7 the data storage element 20 further comprises a system management controller (SMC) offering bit-stream tenant management interfaces.

Examples may introduce changes or being implemented in intelligent, programmable NICs (network interface cards) or accelerators being configured to track consistency address ranges in a current element, for example, a base station or a central office. As mentioned before, compute sleds or disaggregated resources sleds (memory or storage sleds) may include an example of the network component 10 that is responsible to track and manage consistency across multiple address ranges that need to be replicated across multiple peers or data storage elements. This particular logic may also be implemented in multiple places of the data center depending on the technology available, architecture constraints and cost. FIG. 7 shows logical elements an example of the network component 10 may include.

For example, a set of interfaces 12 may be exposed to the software layer (e.g. an orchestrator) in order to configure the different ranges to be tracked (e.g. per tenant basis) and how they need to be tracked. Each tenant may configure a set of address ranges with a consistency type (hierarchical or peer to peer) and, for example, one bit stream that can be used to implement per tenant consistency policies. The information may further include a list of peers to be consistent and configuration information on the consistency requirements, for example, resource requirements (e.g. fabric) and consistency time requirements.

The network component 10 may further comprise an accelerator or computing element that is responsible to track the aforementioned elements and propagate changes to the peers when they are detected, e.g. in terms of the above described logical component 14. This logic may also be responsible to decide when to change modes if the hybrid solution is configured. A further component may be a configuration table or system address decoder that may be used to store the configuration and how the actual translation is done. Another component may be logic that is responsible to handle incoming update requests from consistency updates from other peers, which can also be part of the logical component 14 in some examples. The logical component 14 may further handle consistency problems with peers, updates to the local data and consistency with user requests, and coordination with an upper layer when data replication is carried out. Another example is a pod manager extended by an example of the network component 10, in order to expose interfaces to an orchestrator in order to manage the different components and interfaces discussed herein. Examples of the network component 10 may be configured to register a data consistency or replication service for a communication service provider identification, a cloud service provider identification, a tenant identification and a list of peers that the data is to be replicated at.

Figure 8:
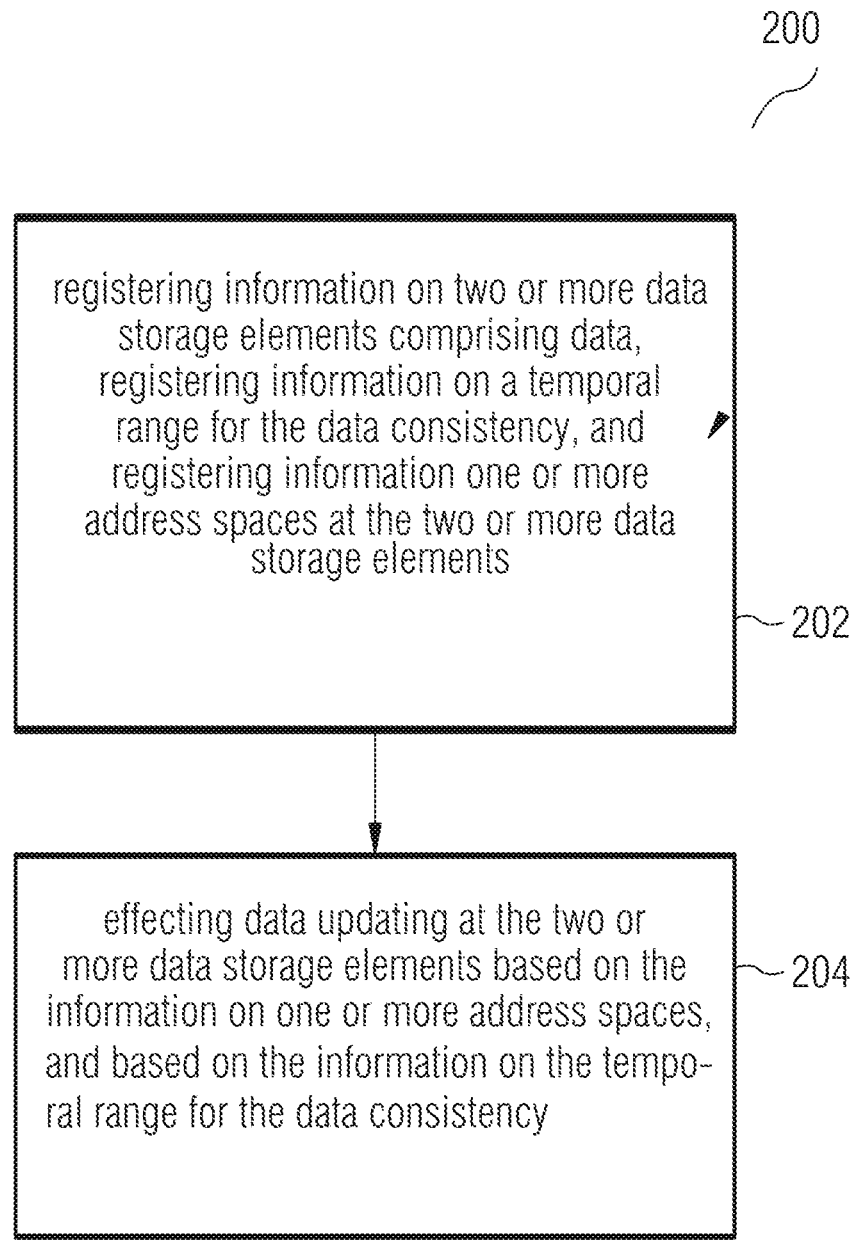
FIG. 8 shows a block diagram of an example of a method.

FIG. 8 shows a block diagram of an example of a method 200. The method 200 for managing data replication among two or more data storage elements 20, 30 in a network 40 comprises registering 202 information on the two or more data storage elements 20, 30 comprising the data and registering information on one or more address spaces at the two or more data storage elements 20, 30 to address the data. The method 200 further comprises effecting 204 data replication at the two or more data storage elements 20, 30 based on the information on one or more address spaces at the two or more data storage elements 20, 30 to address the data.

The examples as described herein may be summarized as follows:

Example 1 is a network component 10 configured to manage data consistency among two or more data storage elements 20, 30 in a network 40. The network component 10 comprises one or more interfaces 12 configured to register information on the two or more data storage elements 20,30 comprising the data, information on a temporal range for the data consistency, and information on one or more address spaces at the two or more data storage elements 20, 30 to address the data. The network component 10 comprises a logical component 14 configured to effect data updating at the two or more data storage elements 20, 30 based on the information on one or more address spaces at the two or more data storage elements 20, 30 and the information on the temporal range for the data consistency.

Example 2 is the network component 10 of example 1, wherein the one or more interfaces 12 are further configured to receive information on a data change of the data in the one or more address spaces, and wherein the logical component 14 is configured to effect data consistency at the two or more data storage elements 20, 30 based on the information on the data change.

Example 3 is the network component 10 of example 1, wherein the information on the one or more address spaces at the two or more data storage elements 20, 30 comprises information on specific data ranges that are to be kept consistent.

Example 4 is the network component 10 of example 1, wherein the two or more data storage elements 20, 30 are comprised in base stations or central offices in a cloud based communication network 40.

Example 5 is the network component 10 of example 4, wherein the cloud based network is configured to provide edge computing services at the two or more data storage elements 20, 30.

Example 6 is the network component 10 of example 1, wherein the information on the temporal range specifies a period of time, wherein the logical component 14 is configured to effect data alignment at the two or more data storage elements 20, 30 within the period of time.

Example 7 is the network component 10 of example 1, wherein the logical component 14 is configured to effect data updating at the two or more data storage elements using data invalidation.

Example 8 is the network component 10 of example 1, wherein the one or more interfaces 12 are further configured to receive information on a quality of service or information on a service level agreement, and wherein the logical component 14 is configured to effect a certain bandwidth availability in the network based on the information on the quality of service or the information on the service level agreement.

Example 9 is the network component 10 of example 1, wherein the information on the two or more data storage elements 20, 30 comprises information on a group identification of a group of multiple data storage devices.

Example 10 is the network component 10 of example 1, wherein the logical component 14 is configured to track data in the address spaces at the two or more data storage elements 20, 30 and to propagate data changes to the data storage elements 20, 30.

Example 11 is the network component 10 of example 1, wherein the logical component 14 is configured to register a bit-stream in the network to implement a data replication policy.

Example 12 is the network component 10 of example 1, wherein the network 40 comprises a hierarchical architecture with multiple tiers of network elements in multiple tier levels, wherein the logical component 14 is configured to communicate a request for data consistency to a component in a tier being at least one tier level above a tier comprising the two or more data storage components 20, 30.

Example 13 is the network component 10 of example 1, wherein the network 40 comprises a hierarchical architecture with multiple tiers of network elements in multiple tier levels, wherein the logical component 14 is configured to communicate a request for data consistency to a component in a tier being on the same tier level as a tier comprising the two or more data storage components 20, 30.

Example 14 is the network component 10 of example 1, wherein the network 40 comprises a hierarchical architecture with multiple tiers of network elements in multiple tier levels, wherein the logical component 14 is configured to communicate a request for data consistency firstly to a component in a tier being on the same tier level as a tier comprising the two or more data storage components 20, 30, to monitor a number of conflicts arising by the request in the network 40, and, in case the number of conflicts exceeds a threshold, to communicate the request for data consistency secondly to a component in a tier being at least one level above the tier comprising the two or more data storage components 20,30.

Example 15 is the network component 10 of example 14, wherein a conflict arising by the request in the network 40 corresponds to an address conflict based on multiple updates for the same address range at a data storage element 20, 30.

Example 16 is the network component 10 of example 1 being configured to register a data consistency or replication service for a communication service provider identification, a cloud service provider identification, a tenant identification and a list of peers that the data is to be replicated at.

Example 17 is an apparatus 10 for managing data consistency among two or more data storage elements 20, 30 in a network 40. The apparatus 10 comprises means 12 for registering information on the two or more data storage elements 20, 30 comprising the data, for registering information on a temporal range for the data consistency, and for registering information on one or more address spaces at the two or more data storage elements 20, 30 to address the data. The apparatus 10 further comprises means 14 for effecting data consistency at the two or more data storage elements 20, 30 based on the information on one or more address spaces at the two or more data storage elements 20, 30 and based on the information on the temporal range for the data consistency.

Example 18 is the apparatus 10 of example 17, wherein the means for registering 12 is further configured to receive information on a data change of the data in the one or more address spaces, and wherein the means 14 for effecting is configured to effect data consistency at the two or more data storage elements 20, 30 based on the information on the data change.

Example 19 is the apparatus 10 of example 17, wherein the information on the one or more address spaces at the two or more data storage elements 20, 30 comprises information on specific data ranges that are to be kept consistent.

Example 20 is the apparatus 10 of example 17, wherein the means for effecting 14 data consistency is configured to effect data updating at the two or more data storage elements using data invalidation.

Example 21 is the apparatus 10 of example 17, wherein the two or more data storage elements 20, 30 are comprised in base stations or central offices in a cloud based communication network.

Example 22 is the apparatus 10 of example 21, wherein the cloud based network is configured to provide edge computing services at the two or more data storage elements 20, 30.

Example 23 is the apparatus 10 of example 17, wherein the information on the temporal range specifies a period of time, wherein the means 14 for effecting is configured to effect data consistency at the two or more data storage elements 20, 30 within the period of time.

Example 24 is the apparatus 10 of example 17, wherein the means 12 for registering is further configured to receive information on a quality of service or information on a service level agreement, and wherein the means 14 for effecting is configured to effect a certain bandwidth availability in the network based on the information on the quality of service or the information on the service level agreement.

Example 25 is the apparatus 10 of example 17, wherein the information on the two or more data storage elements 20, 30 comprises information on a group identification of a group of multiple data storage devices.

Example 26 is the apparatus 10 of example 17, wherein the means 14 for effecting is configured to track data in the address spaces at the two or more data storage elements 20, 30 and to propagate data changes to the data storage elements.

Example 27 is the apparatus 10 of example 17, wherein the means 14 for effecting is configured to register a bitstream in the network to implement a data replication policy.

Example 28 is the apparatus 10 of example 17, wherein the network 40 comprises a hierarchical architecture with multiple tiers of network elements in multiple tier levels, wherein the means 14 for effecting is configured to communicate a request for data consistency to a component in a tier being at least one tier level above a tier comprising the two or more data storage components 20, 30.

Example 29 is the apparatus 10 of example 17, wherein the network 40 comprises a hierarchical architecture with multiple tiers of network elements in multiple tier levels, wherein the means 14 for effecting is configured to communicate a request for data consistency to a component in a tier being on the same tier level as a tier comprising the two or more data storage components 20, 30.

Example 30 is the apparatus 10 of example 17, wherein the network 40 comprises a hierarchical architecture with multiple tiers of network elements in multiple tier levels, wherein the means 14 for effecting is configured to communicate a request for data consistency firstly to a component in a tier being on the same tier level as a tier comprising the two or more data storage components 20, 30, to monitor a number of conflicts arising by the request in the network 40, and, in case the number of conflicts exceeds a threshold, to communicate the request for data consistency secondly to a component in a tier being at least one level above the tier comprising the two or more data storage components 20, 30.

Example 31 is the apparatus 10 of example 30, wherein a conflict arising by the request in the network corresponds to an address conflict based on multiple updates for the same address range at a data storage element 20, 30.

Example 32 is the apparatus 10 of example 17, being configured to register a data consistency or replication service for a communication service provider identification, a cloud service provider identification, a tenant identification and a list of peers that the data is to be replicated at.

Example 33 is a network switch comprising the network component 10 of example 1 or the apparatus 10 of example 17.

Example 34 is a central office comprising the network component 10 of example 1 or the apparatus 10 of example 17.

Example 35 is a base station comprising the network component 10 of example 1 or the apparatus 10 of example 17.

Example 36 is a data storage element comprising the network component 10 of example 1 or the apparatus 10 of example 17.

Example 37 is a method 200 for managing data consistency among two or more data storage elements 20, 30 in a network 40. The method 200 comprises registering 202 information on the two or more data storage elements 20, 30 comprising the data, registering 202 information on a temporal range for the data consistency, and registering 202 information on one or more address spaces at the two or more data storage elements 20, 30 to address the data. The method further comprises effecting 204 data updating at the two or more data storage elements 20, 30 based on the information on one or more address spaces at the two or more data storage elements 20, 30 to address the data and based on the information on the temporal range for the data consistency.

Example 38 is the method 200 of example 37, wherein the registering 202 further comprises receiving information on a data change of the data in the one or more address spaces, and wherein the effecting 204 further comprises effecting data consistency at the two or more data storage elements 20, 30 based on the information on the data change.

Example 39 is the method 200 of example 37, wherein the information on the one or more address spaces at the two or more data storage elements 20, 30 comprises information on specific data ranges that are to be replicated.

Example 40 is the method 200 of example 37, wherein the two or more data storage elements 20, 30 are comprised in base stations or central offices in a cloud based communication network.

Example 41 is the method 200 of example 40, wherein the cloud based network is configured to provide edge computing services at the two or more data storage elements 20, 30.

Example 42 is the method 200 of example 37, wherein the information on the temporal range specifies a period of time, wherein the effecting 204 is configured to effect data consistency at the two or more data storage elements 20, 30 within the period of time.

Example 43 is the method 200 of example 42, wherein effecting 204 data updating at the two or more data storage elements 20, 30 comprises using data invalidation.

Example 44 is the method 200 of example 37, wherein the registering 202 comprises receiving information on a quality of service or information on a service level agreement, and wherein the effecting 204 comprises effecting a certain bandwidth availability in the network based on the information on the quality of service or the information on the service level agreement.

Example 45 is the method 200 of example 37, wherein the information on the two or more data storage elements 20, 30 comprises information on a group identification of a group of multiple data storage devices.

Example 46 is the method 200 of example 37, wherein the effecting 204 comprises tracking data in the address spaces at the two or more data storage elements 20, 30 and to propagate data changes to the data storage elements 20, 30.

Example 47 is the method 200 of example 37, wherein the effecting 204 comprises registering a bit-stream in the network to implement a data consistency policy.

Example 48 is the method 200 of example 37, wherein the network 40 comprises a hierarchical architecture with multiple tiers of network elements in multiple tier levels, wherein the effecting 204 comprises communicating a request for data consistency to a component in a tier being at least one tier level above a tier comprising the two or more data storage components 20, 30.

Example 49 is the method 200 of example 37, wherein the network 40 comprises a hierarchical architecture with multiple tiers of network elements in multiple tier levels, wherein the effecting 204 is configured to communicate a request for data consistency to a component in a tier being on the same tier level as a tier comprising the two or more data storage components 20, 30.

Example 50 is the method 200 of example 37, wherein the network 40 comprises a hierarchical architecture with multiple tiers of network elements in multiple tier levels, wherein the effecting 204 comprises communicating a request for data consistency firstly to a component in a tier being on the same tier level as a tier comprising the two or more data storage components 20, 30, monitoring a number of conflicts arising by the request in the network 40, and, in case the number of conflicts exceeds a threshold, communicating the request for data consistency secondly to a component in a tier being at least one level above the tier comprising the two or more data storage components 20, 30.

Example 51 is the method 200 of example 50, wherein a conflict arising by the request in the network corresponds to an address conflict based on multiple updates for the same address range at a data storage element 20, 30.

Example 52 is the method 200 of example 37, further comprising registering a data consistency or replication service for a communication service provider identification, a cloud service provider identification, a tenant identification and a list of peers that the data is to be replicated at.

Example 53 is a computer program having a program code for performing the method of example 37, when the computer program is executed on a computer, a processor, or a programmable hardware component.

Example 54 is a machine readable storage including machine readable instructions, when executed, to implement a method or realize an apparatus as exemplified in any of the above examples.

Example 55 is a machine readable medium including code, when executed, to cause a machine to perform the method of example 37.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a signal", "means for generating a signal.", may be implemented in the form of dedicated hardware, such as "a signal provider", "a signal processing unit", "a processor", "a controller", as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A network component configured to manage data consistency among two or more data storage elements, comprising
   one or more interfaces configured to register information, on the two or more data storage elements in a tiered network, comprising the data, information on a temporal range for the data consistency, and information on one or more address spaces at the two or more data storage elements to address the data; and
   a processor comprising a logical component configured to effect data updating at the two or more data storage elements in the tiered network, based on the information on the one or more address spaces at the two or more data storage elements and the information on the temporal range for the data consistency, wherein the tiered network comprises a hierarchical architecture with multiple tiers of network elements in multiple tier levels, and the two or more data storage elements are at an edge tier or lower, wherein the edge tier is lower than a network cloud tier at the top of the hierarchical architecture;

wherein the logical component is configured:

to communicate a request for data consistency firstly to a component in a tier being on the same tier level as a tier comprising the two or more data storage components, to monitor a number of conflicts arising by the request in the tiered network, and, in case the number of conflicts exceeds a threshold, to communicate the request for data consistency secondly to a component in a tier being at least one level above the tier comprising the two or more data storage components; and wherein a conflict arising by the request in the tiered network corresponds to an address conflict based on multiple updates for the same address range at the two or more data storage elements.

2. The network component of claim 1, wherein the one or more interfaces are further configured to receive information on a data change of the data in the one or more address spaces, and wherein the logical component is configured to effect data consistency at the two or more data storage elements based on the information on the data change.

3. The network component of claim 1, wherein the information on the one or more address spaces at the two or more data storage elements comprises information on specific data ranges that are to be kept consistent.

4. The network component of claim 1, wherein the two or more data storage elements are comprised in base stations or central offices in a cloud based communication network, wherein the base stations or central offices are at the edge tier.

5. The network component of claim 4, wherein the cloud based network is configured to provide edge computing services at the two or more data storage elements.

6. The network component of claim 1, wherein the information on the temporal range specifies a period of time, wherein the logical component is configured to effect data alignment at the two or more data storage elements within the period of time.

7. The network component of claim 1, wherein the logical component is configured to effect data updating at the two or more data storage elements using data invalidation.

8. The network component of claim 1, wherein the one or more interfaces are further configured to receive information on a quality of service or information on a service level agreement, and wherein the logical component is configured to effect a certain bandwidth availability in the tiered network based on the information on the quality of service or the information on the service level agreement.

9. The network component of claim 1, wherein the information on the two or more data storage elements comprises information on a group identification of a group of multiple data storage devices.

10. The network component of claim 1, wherein the logical component is configured to track data in the address spaces at the two or more data storage elements and to propagate data changes to the data storage elements.

11. The network component of claim 1, wherein the logical component is configured to register a bit-stream in the tiered network to implement a data replication policy.

12. The network component of claim 1, wherein the logical component is configured to communicate a request for data consistency to a component in a tier being at least one tier level above a tier comprising the two or more data storage components.

13. The network component of claim 1, wherein the logical component is configured to communicate a request for data consistency to a component in a tier being on the same tier level as a tier comprising the two or more data storage components.

14. The network component of claim 1 being configured to register a data consistency or replication service for a communication service provider identification, a cloud service provider identification, a tenant identification and a list of peers that the data is to be replicated at.

15. The network component of claim 1, wherein the two or more data storage elements are at the edge tier, and the hierarchical architecture comprises a lowest tier which is lower than the edge tier.

16. A method for managing data consistency among two or more data storage elements in a network, comprising registering information, on the two or more data storage elements in a tiered network, comprising the data, registering information on a temporal range for the data consistency, and registering information on one or more address spaces at the two or more data storage elements to address the data; and effecting data updating, with a processor, at the two or more data storage elements in the tiered network based on the information on one or more address spaces at the two or more data storage elements to address the data and based on the information on the temporal range for the data consistency;

communicating a request for data consistency firstly to a component in a tier of the tiered network which is on the same tier level as a tier comprising the two or more data storage components; and monitoring a number of conflicts arising by the request in the tiered network, and, in case the number of conflicts exceeds a threshold, communicating the request for data consistency secondly to a component in a tier which is at least one level above the tier comprising the two or more data storage components;

wherein a conflict arising by the request in the tiered network corresponds to an address conflict based on multiple updates for the same address range at the two or more data storage elements;

the tiered network comprises a hierarchical architecture with multiple tiers of network elements in multiple tier levels; and the two or more data storage elements are at an edge tier or lower, wherein the edge tier is lower than a network cloud tier at the top of the hierarchical architecture.

17. The method of claim 16, wherein the registering further comprises receiving information on a data change of the data in the one or more address spaces, and wherein the effecting further comprises effecting data consistency at the two or more data storage elements based on the information on the data change.

18. A non-transitory machine readable medium including code, when executed, to cause a machine to perform a method for managing data consistency among two or more data storage elements in a tiered network, comprising registering information on the two or more data storage elements comprising the data, registering information on a temporal range for the data consistency, and registering information on one or more address spaces at the two or more data storage elements to address the data; and effecting data updating, with a processor, at the two or more data storage elements in the tiered network based on the information on one or more address spaces at the two or more data storage elements to address the data and based on the information on the temporal range for the data consistency;

communicating a request for data consistency firstly to a component in a tier of the tiered network which is on the same tier level as a tier comprising the two or more data storage components; and monitoring a number of conflicts arising by the request in the tiered network, and, in case the number of conflicts exceeds a threshold, communicating the request for data consistency secondly to a component in a tier which is at least one level above the tier comprising the two or more data storage components;

wherein a conflict arising by the request in the tiered network corresponds to an address conflict based on multiple updates for the same address range at the two or more data storage elements;

the tiered network comprises a hierarchical architecture with multiple tiers of network elements in multiple tier levels; and the two or more data storage elements are at an edge tier or lower, wherein the edge tier is lower than a network cloud tier at the top of the hierarchical architecture.

* * * * *